United States Patent
Nakaya et al.

(10) Patent No.: US 7,606,153 B2
(45) Date of Patent: Oct. 20, 2009

(54) STORAGE SYSTEM AND INFORMATION PROCESSING SYSTEM

(75) Inventors: Hironobu Nakaya, Yokohama (JP); Hiroyuki Shobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 886 days.

(21) Appl. No.: 11/128,264

(22) Filed: May 13, 2005

(65) Prior Publication Data

US 2006/0209707 A1    Sep. 21, 2006

(30) Foreign Application Priority Data

Mar. 15, 2005    (JP) .............................. 2005-072679

(51) Int. Cl.
*H04J 1/16* (2006.01)
*H04L 1/00* (2006.01)

(52) U.S. Cl. .................. 370/231; 370/217; 370/219; 370/232; 370/233; 370/234; 370/235; 370/236; 370/237; 370/238; 370/252; 370/253; 370/389; 370/390; 370/395.71; 370/396; 370/400; 370/414; 709/223; 709/225; 709/219; 709/229

(58) Field of Classification Search .................. None
See application file for complete search history.

(56) References Cited

U.S. PATENT DOCUMENTS

| 2005/0135235 | A1* | 6/2005 | Maruyama et al. | 370/219 |
| 2005/0210144 | A1* | 9/2005 | Kumagai et al. | 709/229 |
| 2008/0126525 | A1* | 5/2008 | Ueoka et al. | 709/223 |

FOREIGN PATENT DOCUMENTS

| JP | 2003273951 |   | 9/2003 |
| JP | 2004171172 | A * | 6/2004 |

* cited by examiner

*Primary Examiner*—Raj Jain
(74) *Attorney, Agent, or Firm*—Brundidge & Stanger, P.C.

(57) ABSTRACT

Prior to alteration of the communication route connecting the enterprise servers $5_1$ to $5_3$, ports a, b and c of the enterprise server $5_1$ are each connected with port 1 of the storage system 7 through the communication route. When enterprise server $5_4$ is connected with the storage system 7 in response to a new connection request, the communication port of the storage system 7 with which ports a, b and c are respectively connected through the communication route is altered to port 3. Due to this alteration, the enterprise server $5_4{}^4$ can be connected through its port f via the communication route with the port 1 of the storage system 7, which was thus freed.

2 Claims, 14 Drawing Sheets

FIG. 3

| STORAGE SYSTEM IDENTIFICATION INFORMATION | COMMUNICATION PORT IDENTIFICATION INFORMATION | MAXIMUM DATA TRANSFER RATE (MB/S) |
|---|---|---|
| STORAGE SYSTEM 1 | PORT 1 | 100 |
| | PORT 2 | 100 |
| | PORT 3 | 200 |
| | PORT 4 | 100 |
| | PORT 5 | 300 |
| | ⋮ | ⋮ |
| 111 | 113 | 115 |

FIG. 4

| COMMUNICATION PORT IDENTIFICATION INFORMATION | MAXIMUM DATA TRANSFER RATE (MB/S) |
|---|---|
| PORT 1 | 100 |
| PORT 2 | 100 |
| PORT 3 | 200 |
| PORT 4 | 100 |
| PORT 5 | 300 |
| ⋮ | ⋮ |
| 113 | 115 |

FIG. 5

| ENTERPRISE SERVER IDENTIFICATION INFORMATION | COMMUNICATION PORT IDENTIFICATION INFORMATION |
|---|---|
| ENTERPRISE SERVER 1 | PORT a |
| | PORT b |
| | PORT c |
| ENTERPRISE SERVER 2 | PORT d |
| ENTERPRISE SERVER 3 | PORT e |
| ⋮ | ⋮ |

| COMMUNICATION PORT IDENTIFICATION INFORMATION |
|---|
| PORT a |
| PORT b |
| PORT c |

| COMMUNICATION PORT IDENTIFICATION INFORMATION | TRAFFIC AMOUNT (MB/S) | | | | |
|---|---|---|---|---|---|
| | TIME BAND 1 | TIME BAND 2 | TIME BAND 3 | ... | TIME BAND n |
| PORT 1 | 10 | 20 | 30 | ... | 40 |
| PORT 2 | 10 | 10 | 10 | ... | 70 |
| PORT 3 | 50 | 50 | 50 | ... | 50 |
| PORT 4 | 60 | 60 | 60 | ... | 60 |
| PORT 5 | 70 | 70 | 70 | ... | 70 |
| ... | ... | | | | |

125 127

126 (PORT 1, PORT 2)
128 (PORT 3, PORT 4, PORT 5)

FIG. 8

| STORAGE SYSTEM COMMUNICATION PORT IDENTIFICATION INFORMATION | ENTERPRISE SERVER COMMUNICATION PORT IDENTIFICATION INFORMATION |
|---|---|
| PORT 1 | PORT a |
| | PORT b |
| | PORT c |
| PORT 2 | PORT d |
| PORT 3 | PORT e |
| ... | ... |

129 131

< ROUTE CONNECTION/ROUTE ALTERATION REQUEST MESSAGE >

< ROUTE CONNECTION/ROUTE ALTERATION RESPONSE MESSAGE >

< INFORMATION ACQUISITION REQUEST MESSAGE >

< INFORMATION ACQUISITION RESPONSE MESSAGE >

FIG. 13

| TRAFFIC AMOUNT ACQUISITION REQUEST RECEPTION TIME POINT ON PREVIOUS OCCASION: tA [s]<br>TRAFFIC AMOUNT ACQUISITION REQUEST RECEPTION TIME POINT ON CURRENT OCCASION: tB [s] |
|---|
| CUMULATIVE TOTAL OF COMMUNICATION AMOUNT OF PORT 1: d1 [MB]<br>CUMULATIVE TOTAL OF COMMUNICATION AMOUNT OF PORT 2: d2 [MB]<br>.<br>.<br>CUMULATIVE TOTAL OF COMMUNICATION AMOUNT OF PORT n: dn [MB] |

FIG. 14

| TRAFFIC AMOUNT OF PORT 1 = d1/(tA−tB)[MB/s]<br>TRAFFIC AMOUNT OF PORT 2 = d2/(tA−tB)[MB/s]<br>.<br>.<br>TRAFFIC AMOUNT OF PORT n = dn/(tA−tB)[MB/s] |
|---|

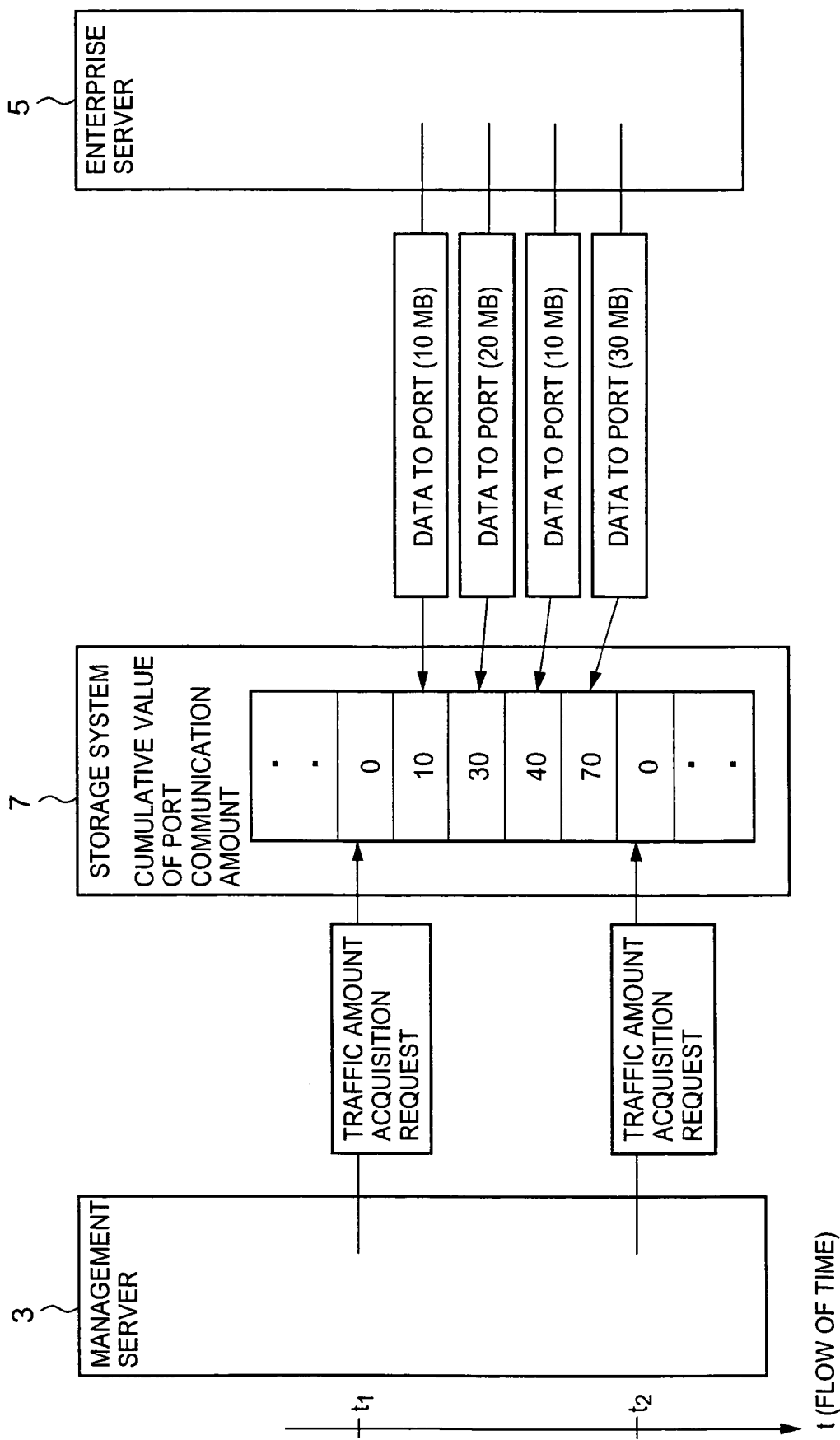

FIG. 16

(a) (1) TOTAL THE TRAFFIC AMOUNTS OF EACH TIME POINT OF PORT 1 AND PORT 2

| TIME POINT | 1 | 2 | 3 | | n |
|---|---|---|---|---|---|
| PORT 1 | 10 | 20 | 30 | | 40 |
| PORT 2 | 10 | 10 | 10 | | 70 |
| TOTAL FLOW AMOUNT AT TIME POINT m | 20 | 30 | 40 | | 110 |
| MAXIMUM DATA TRANSFER RATE OF PORT 2 | 100 | | | | |

TOTAL VALUE FLOW AMOUNT= 20+30+40+110=200

EXCLUDED FROM CONSIDERATION, SINCE THE MAXIMUM VALUE OF THE TOTAL FLOW AMOUNT AT TIME POINT m EXCEEDS THE MAXIMUM DATA TRANSFER RATE OF PORT 2

(b) (2) TOTAL THE TRAFFIC AMOUNTS OF EACH TIME POINT OF PORT 1 AND PORT 3

| TIME POINT | 1 | 2 | 3 | | n |
|---|---|---|---|---|---|
| PORT 1 | 10 | 20 | 30 | | 40 |
| PORT 3 | 50 | 50 | 50 | | 50 |
| TOTAL FLOW AMOUNT AT TIME POINT m | 60 | 70 | 80 | | 90 |
| MAXIMUM DATA TRANSFER RATE OF PORT 3 | 200 | | | | |

TOTAL VALUE FLOW AMOUNT= 60+70+80+90= 300

(c) (3) TOTAL THE TRAFFIC AMOUNTS OF EACH TIME POINT OF PORT 1 AND PORT 4

| TIME POINT | 1 | 2 | 3 | | n |
|---|---|---|---|---|---|
| PORT 1 | 10 | 20 | 30 | | 40 |
| PORT 4 | 60 | 60 | 60 | | 60 |
| TOTAL FLOW AMOUNT AT TIME POINT m | 70 | 80 | 90 | | 100 |
| MAXIMUM DATA TRANSFER RATE OF PORT 4 | 100 | | | | |

TOTAL VALUE FLOW AMOUNT= 70+80+90+100= 340

THE DESTINATION IS ALTERED TO PORT 3, WHICH IS THE PORT WITH THE LEAST TOTAL VALUE FLOW AMOUNT (d) (4) TOTAL THE TRAFFIC AMOUNTS OF EACH TIME POINT OF PORT 1 AND PORT 5

| TIME POINT | 1 | 2 | 3 | | n |
|---|---|---|---|---|---|
| PORT 1 | 10 | 20 | 30 | | 40 |
| PORT 5 | 70 | 70 | 70 | | 70 |
| TOTAL FLOW AMOUNT AT TIME POINT m | 80 | 90 | 100 | | 110 |
| MAXIMUM DATA TRANSFER RATE OF PORT 5 | 300 | | | | |

TOTAL VALUE FLOW AMOUNT= 80+90+100+110= 380

FIG. 17

<PRIOR TO UPDATING>

| STORAGE SYSTEM COMMUNICATION PORT IDENTIFICATION INFORMATION | ENTERPRISE SERVER COMMUNICATION PORT IDENTIFICATION INFORMATION |
|---|---|
| PORT 1 | PORT a |
| | PORT b |
| | PORT c |
| PORT 2 | PORT d |
| PORT 3 | PORT e |
| ... | ... |

<AFTER UPDATING>

| STORAGE SYSTEM COMMUNICATION PORT IDENTIFICATION INFORMATION | ENTERPRISE SERVER COMMUNICATION PORT IDENTIFICATION INFORMATION |
|---|---|
| PORT 1 | PORT f |
| PORT 2 | PORT d |
| PORT 3 | PORT e |
| ... | ... |

(NOTES)

— ROUTE
------ ALTERED ROUTE
— — — NEWLY CONNECTED ROUTE

STORAGE SYSTEM AND INFORMATION PROCESSING SYSTEM

CROSS REFERENCE TO PRIOR APPLICATION

This application relates to and claims priority from Japanese Patent Application No. 2005-072679, filed on 15th Mar. 2005, the entire disclosure of which is incorporated herein by reference.

BACKGROUND OF THE INVENTION

1. Field of the Invention

The present invention relates to an information processing system comprising a storage system, one or two or more servers that perform data communication with the storage system and a connection control device that controls connection between the storage system and the servers.

2. Description of the Related Art

Conventionally, in the technical field of information processing systems, information processing devices and communication channel selection methods have been proposed constituted such that, even if the characteristics of a plurality of communication channels existing between information processing devices are changing, an optimum communication channel can be selected from this plurality of communication channels.

In this proposal, an information processing device having a shared storage system capable of being accessed by hosts references an NIC group wherein a plurality of communication channels linked with the hosts are connected, an I/O processing unit that executes I/O processing of the shared storage system in response to host I/O requests, a hard disk that holds log information in respect of each data transfer performed between the hosts, and log information held by the hard disk. A communication channel selection unit may be provided (as disclosed for example in Laid-open Japanese Patent Application No. 2003-273951) that selects as a data transfer route a communication channel for which good results were obtained i.e. that showed good I/O processing performance, from among the communication channels employed in past data transfers under similar communication conditions.

SUMMARY OF THE INVENTION

In a conventional information processing system, in an environment in which logical communication routes are set up employing a storage area network (SAN) between a plurality of enterprise servers and a storage system, when there is an incoming request for connection of another, new enterprise server to the storage system, a communication port having the greatest margin as regards processing performance is selected from among the communication ports possessed by the storage system. This other enterprise server relating to the new communication request was then arranged to be connected to this selected communication port.

However, there is a problem that, if, as described above, an enterprise server as aforesaid is connected with a communication port having a margin in respect of processing performance, from among the communication ports possessed by the storage system, if the amount of data communication between this other server and the storage system is large, the servers that are already connected may come under pressure, resulting in a loss of access performance to the volumes of the storage system owned by these servers. Thus it becomes impossible to conduct data communication with the storage system in an unhindered fashion.

Consequently, in an information processing system comprising a storage system, an object of the present invention is to ensure that, even when a server relating to a new connection request is connected with the storage system, the servers that are already connected with the storage system do not experience an adverse effect on data communication with the storage system.

A storage system according to a first aspect of the present invention comprises: a plurality of communication ports connected with one or two or more servers; an information communication amount data holding unit that holds information communication amount data in respect of said each of communication ports; a load calculation unit that, when there is a request to acquire data relating to the magnitude of the load of said communication ports from outside, calculates the magnitude of the load of each of said communication ports in accordance with a prescribed computational processing procedure, based on the information communication amount data for each of said communication ports held in said information communication amount data holding unit; and a data transmission unit that transmits data relating to the magnitude of said load calculated by said load calculation unit to the source of transmission of said acquisition request.

In a suitable embodiment according to the first aspect of present invention, the magnitude of the load of each of said communication ports is found by said load calculation unit by the cumulative total value of the amount of data communication from said servers through said communication ports in a prescribed time.

In another embodiment to that described above, the communication ports are physical communication ports.

Also, in another embodiment to that described above, the communication ports and the servers are connected through logically defined communication routes in a physical communication route that is connected between said communication ports and said servers.

In yet a further embodiment to that described above, there is further provided a connection relationship altering unit that alters the connection relationship between said communication ports and said servers in accordance with a connection alteration request from outside.

An information processing system according to a second aspect of the present invention comprises: a storage system, one or two or more servers that perform data communication with said storage system, and a connection control device that controls the connection between said storage system and said servers; wherein said connection control device comprises: a connection destination identification unit for identifying which communication port of said plurality of communication ports possessed by said storage system is the destination of connection with which server of said one or two or more servers, based on reports from said storage system; a connection request identification unit that identifies whether or not a new connection request has been made in respect of said storage system; a connection destination alteration decision unit that, when said connection request identification unit identifies a new connection request and said connection destination identification unit identifies that all of said plurality of communication ports possessed by said storage system are connection destinations with said server, prepares a free communication port as a communication destination with a server relating to the new communication request, by deciding on alteration of the connection destination of said server that is the connection destination of one of said plurality of communication ports possessed by said storage system, to another communication port; and an instruction output unit that issues an instruction to said storage system such as to connect the server relating to said new connection request to said free communication port that has been prepared by said connection destination alteration decision unit.

In a suitable embodiment according to the second aspect of the present invention, when data relating to the magnitude of the load of each of a plurality of communication ports possessed by said storage system is received from said storage system, said connection destination alteration decision unit decides on alteration of a communication port the magnitude of whose load has been identified as being a minimum in accordance with data relating to the magnitude of said load to said communication destination.

An information processing system according to a third aspect of the present invention comprises a storage system having a plurality of communication ports, one or two or more servers that perform data communication with said storage system and a connection control device that controls set-up of an access route between said storage system and said servers, wherein said connection control device finds the load on each of said respective communication ports possessed by said storage system, finds a combination of communication ports capable of being shared in accordance with said load, and sets the access route that was set up to one of the communication ports that are thus found to another communication port that is thus found.

In a suitable embodiment according to the third aspect of the present invention, the combination of communication ports capable of being shared that is found by said connection control device is a combination of communication ports in respect of which the total value of said load that is thus found is equal to or less than a prescribed value.

In another embodiment to that described above, said connection control device additionally finds, for each access route with said servers, the load of each of said communication ports, in accordance with the load that was thus found finds another communication port to which are allocated all the access routes that were set up to a specified communication port, and sets an access route that was set to said specified communication port to this communication port that has thus been found.

A method that is performed in a storage system according to a fourth aspect of the present invention is performed in a storage system comprising a plurality of communication ports and comprises: a step of connecting one or two or more servers with said plurality of communication ports; a step of holding information communication amount data of each of said communication ports; a step of, when there is a request for acquisition of data relating to the magnitude of the load of said communication ports from outside, calculating the magnitude of the load of each of said communication ports in accordance with a prescribed computational processing procedure, based on the information communication amount data for each of said communication ports held in the step of holding said information communication amount data; and a step of transmitting data relating to the magnitude of said load calculated by the step of calculating the magnitude of said load to the transmission source of said acquisition request.

In a suitable embodiment according to the fourth aspect of the present invention, the magnitude of the load of each of said communication ports found in the step whereby the magnitude of said load is calculated is found by the cumulative value of the amount of data communication from said server through said communication ports in a prescribed time.

In another suitable embodiment apart from that described above, said communication ports are physical communication ports.

Also, in another suitable embodiment apart from that described above, the communication ports and the servers are connected through logically defined communication routes in a physical communication route that is connected between said communication ports and said servers.

Also, in another suitable embodiment to that described above, there is further provided a step of altering the connection relationship between said communication ports and said servers in accordance with a connection alteration request from outside.

A method that is performed in an information processing system according to a fifth aspect of the present invention comprises: a storage system, one or two or more servers that perform data communication with said storage system, and a connection control device that controls the connection between said storage system and said servers; wherein said connection control device comprises: a step for identifying to which server of said one or two or more servers which communication port of said plurality of communication ports possessed by said storage system is connected, based on reports from said storage system; an identification step wherein whether or not a new connection request has been made in respect of said storage system is identified; a step of preparing a free communication port as a communication destination with the server to which the new connection request relates, by deciding on alteration of a connection destination of said server that is the connection destination of one of said plurality of communication ports possessed by said storage system to, another communication port if, in said step of identifying whether or not a new connection request has been made, a new connection request is identified and, in said step of identifying whether or not a new connection request has been made, it is found that all of the plurality of communication ports possessed by said storage system are connected with said server; and a step of issuing an instruction to said storage system such that the server relating to said new connection request is connected to said free communication port prepared by the step of preparing said free communication port.

In a suitable embodiment according to the fifth aspect of the present invention, in the step of preparing said free communication port, when data relating to the magnitude of the load of each of a plurality of communication ports possessed by said storage system is received from said storage system, a decision is made to alter a communication port the magnitude of whose load has been identified as being a minimum, to said communication destination, in accordance with data relating to the magnitude of said load.

A method performed in an information processing system according to the sixth aspect of the present invention is performed in an information processing system comprising a storage system having a plurality of communication ports, one or two or more servers that perform data communication with said storage system, and a connection control device that controls set-up of an access route between said storage system and said servers and comprises: a step wherein said connection control device finds the load of each respective said communication port possessed by said storage system; a step of finding a combination of communication ports capable of being shared, based on said load found in said load finding step; and a step of setting the access route that was set up on one communication port found in said step of finding a combination of communication ports capable of being shared to another communication port found in said step of finding a combination of communication ports capable of being shared.

The combination of communication ports capable of being shared found in said step of finding a combination of communication ports capable being of shared in a suitable embodiment according to the sixth aspect of the present invention is a combination of communication ports for which the total value of said load that was found is equal to or less than a prescribed value.

In another suitable embodiment apart from that described above, the step of finding a combination of communication ports capable of being shared further comprises a step of finding, for each access route with said servers, the load of each said communication port, a step of finding another communication port to which are allocated all of the access routes that were set up with a specified communication port, based on the load found in said step, and a step of, in said step of finding another communication port, setting the access route that was set to said specified communication port to the communication port that was thus found.

According to the present invention, in an information processing system comprising a storage system, even if a server is connected to the storage system in accordance with a new connection request, it is possible to ensure that there is no possibility of an adverse effect on data communication with the storage system by the servers that are already connected with the storage system.

BRIEF DESCRIPTION OF THE DRAWINGS

FIG. 3 is a diagram showing an example of a storage system management table comprising a management server according to an embodiment of the present invention;

FIG. 4 is a diagram showing an example of a storage system management table comprising a storage system according to an embodiment of the present invention;

FIG. 5 is a diagram showing an example of an enterprise server management table comprising a management server according to an embodiment of the present invention;

FIG. 6 is a diagram showing an example of an enterprise server management table comprising an enterprise server according to an embodiment of the present invention;

FIG. 7 is a diagram showing an example of a traffic amount management table for managing the amount of traffic to a storage system comprising a management server according to an embodiment of the present invention;

FIG. 8 is a diagram showing an example of a route management table comprising a management server according to an embodiment of the present invention;

FIG. 13 is a diagram showing an example of the internal information held by a flow amount management program loaded in a storage system;

FIG. 14 is a diagram showing an example of a calculation expression for the amount of traffic on the communication ports provided by a storage system;

FIG. 15 is a diagram showing a process for cumulative value calculation of the amount of data communication to a storage system from an enterprise server through a specified communication port provided by the storage system;

FIG. 16 is a diagram showing the process of deciding on alteration, when altering the connection destination of a communication route connecting an enterprise server and a storage system from a given communication port of the storage system to another communication port, in accordance with a traffic amount management table;

FIG. 17 is a diagram showing an example of a process of updating, when altering the connection destination of a communication route connecting an enterprise server and a storage system from a given communication port of the storage system to another communication port, in accordance with a route management table;

DESCRIPTION OF THE PREFERRED EMBODIMENTS

Embodiments of the present invention are described in detail below with reference to the drawings.

Figure 1:
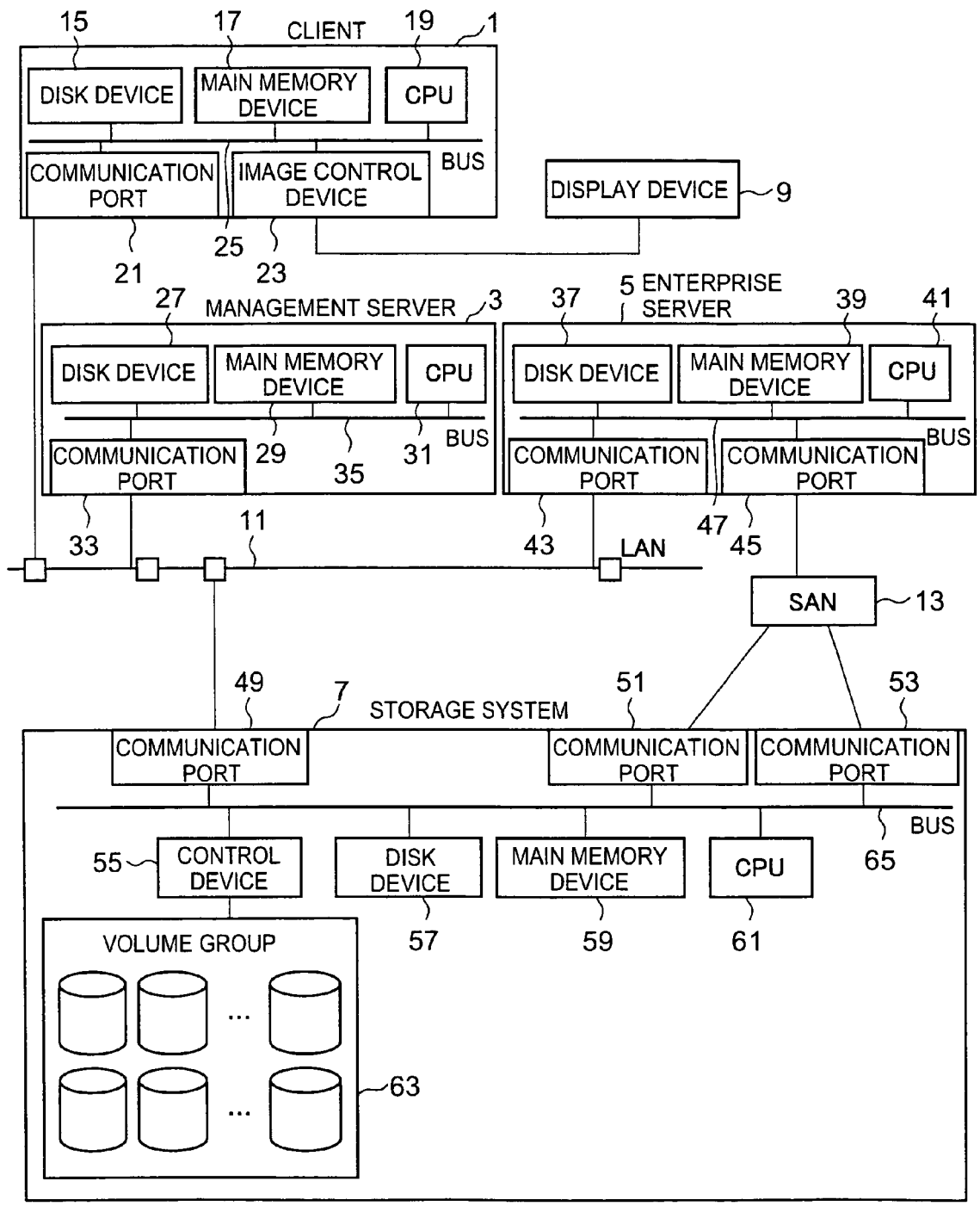
FIG. 1 is a block diagram showing the hardware layout of an entire information processing system comprising a storage system according to an embodiment of the present invention.

FIG. 1 is a block diagram showing the hardware layout of an entire information processing system comprising a storage system according to an embodiment of the present invention.

As shown in FIG. 1, the information processing system comprises a client machine (client) 1, a management server 3, an enterprise server 5 and a storage system 7. A display device 9 is connected with the client 1. In an actual information processing system, there will be a large number of clients, not merely a single client as indicated by the reference symbol 1 and a large number (the same number as the number of clients) of display devices corresponding thereto will also be present, not merely a single display device as indicated by the reference symbol 9. There are also present a plurality of enterprise servers (for example, in FIG. 2, enterprise servers denoted by the reference symbols $5_n$ are included), not merely the single enterprise server indicated by the reference symbol 5. Furthermore, a plurality of storage systems will usually in fact be present, rather than the single storage system indicated by the reference symbol 7.

Hereinbelow, for convenience in description and illustration, in FIG. 1 an example is taken comprising only a single client indicated by the reference symbol 1, a single display device indicated by the reference symbol 9, a single enterprise server indicated by the reference symbol 5 and a single storage system indicated by the reference symbol 7.

Connection between the client 1 and management server 3, between the client 1 and the enterprise server 5, between the client 1 and the storage system 7, between the management server 3 and the enterprise server 5 and between the management server 3 and the storage device 7 is in each case performed through a LAN (Local Area Network) 11. Also, connection between the enterprise server 5 and storage system 7 is performed through a SAN (i.e. a storage area network) 13.

Next, the hardware construction within each unit will be described in detail.

The client 1 comprises a disk device 15, a main memory device 17, a CPU 19, communication port 21, and image control device 23. The various units constituting the client 1 are respectively connected through an internal bus 25.

The disk device 15 stores for example an image control program and/or communication control program, under the control of the CPU 19. The image control program and/or communication control program etc are loaded into the main memory device 17 from the disk device 15 through the internal bus 25 by the CPU 19 as required. Under the control of the CPU 19, the main memory device 17 reads the image control program and/or communication control program etc that were loaded from the disk device 15 through the internal bus 25. The image control program and/or communication control program etc are executed by the CPU 19 on the main memory device 17.

An image control device 23 is connected with the display device 9 and outputs various types of image information from the client 1 to the display device 9 under the control of the CPU 19. A communication port 21 is a physical communication port for making it possible to perform information communication respectively between the client 1 and the management server 3 and between the client 1 and the enterprise server 5, through the LAN 11. A unique value (WWN) is allocated to each communication port 21 and all of the communication ports mentioned below; the individual communication ports can thus be identified using this value.

The CPU 19 executes a prescribed computational processing action whereby it controls the operation of the disk device 15, main memory device 17 and image control device 23 through the internal bus 25.

The various units constituting the information processing system shown in FIG. 1 are placed under the management of the management server 3 and the management server 3 also comprises a disk device 27, main memory device 29, CPU 31 and communication ports 33 in the same way as the client 1. These various units constituting the management server 3 are also respectively connected through an internal bus 35 in the same way as the various units constituting the client 1.

The disk device 27 is under the control of the CPU 31 and stores for example a communication control program and/or route management program and/or data management program. The communication control program and/or route management program and/or data management program etc are loaded into the main memory device 29 from the disk device 27 through the internal bus 35 by the CPU 31 as required. The main memory device 29 is under the control of the CPU 31 and reads for example the communication control program and/or route management program and/or data management program that is loaded from the disk device 27 through the internal bus 35. The communication control program and/or route management program and/or data management program etc are executed on the main memory device 29 by the CPU 31.

The communication port 33 is a physical communication port for making it possible to perform information communication respectively between the management server 3 and the client 1 and with the enterprise server 5, and with the storage system 7 through the LAN 11 by connection of the management server 3 with the LAN 11. The CPU 31 executes a prescribed computational processing action whereby it controls the operation of the disk device 27 and main memory device 29 through the internal bus 35.

It should be noted that in addition to the various programs described above, the data management program also stores various types of table such as for example a storage system management table, enterprise server management table, traffic amount management table, and route management table in the disk device 27.

Like the management server 3, the enterprise server 5 comprises a disk device 37, main memory device 39, CPU 41 and communication port 43 and, in addition, also comprises another communication port 45. The communication port 43 is for connecting the enterprise server 5 with the LAN 11 and the communication port 45 is for connecting the enterprise server 6 with the SAN 13, respectively. The various units constituting the enterprise server 5, like the various units constituting the client 1 and management server 3, are respectively connected through an internal bus 47.

The disk device 37 is under the control of the CPU 41 and stores for example a communication control program and/or route control program and/or data management program. The communication control program and/or route control program and/or data management program are loaded into the main memory device 39 from the disk device 37 through the internal bus 47 by the CPU 41 as required. The main memory device 39 is under the control of the CPU 41 and reads for example the communication control program and/or route control program and/or data management program that are loaded from the disk device 37 through the internal bus 47. The communication control program and/or route control program and/or data management program etc are executed on the main memory device 39 by the CPU 41.

The communication port 43 is a physical communication port for making it possible to perform information communication respectively between the enterprise server 5 and the client 1 and with the management server 3 through the LAN 11 by connection of the enterprise server 5 with the LAN 11. The communication port 45 is a physical communication port for making it possible to perform information communication between the enterprise server 5 and storage system 7 through the SAN 13 by connection of the enterprise server 5 with the SAN 13.

The CPU 41 executes a prescribed computational processing action whereby it controls the operation of the disk device 37 and main memory device 39 through the internal bus 47.

The storage system 7 comprises communication ports 49, 51, 53, a control device 55, a disk device 57, and main memory device 59, a CPU 61, and a storage device constituted by a volume group 63. The volume group 63 comprises for example a plurality of PDEVs (physical volumes) constituted by disk drive devices i.e. HDDs (hard disk drives) or a plurality of LDEVs (logical volumes) constituted by the allocation of a plurality of said PDEVs. Various types of data and/or programs etc that are employed by the client 1 are stored on the volume group 63.

The communication port 49 is a physical communication port for making it possible to perform information communication between the storage system 7 and the management server 3 through the LAN 11 by connecting the storage system 7 and the LAN 11. The communication ports 51, 53 are in each case physical communication ports for making it possible to perform information communication between the storage system 7 and the enterprise server 5, by connecting the storage system 7 and the SAN 13.

The control device 55 controls the operation of the volume group 63 under the control of the CPU 61. The disk device 57 is under the control of the CPU 61 and stores for example a communication control program and/or route control program and/or flow amount management program and/or data management program. The communication control program and/or route control program and/or flow amount management program and/or data management program or the like are loaded into the main memory device 59 from the disk device 57 through the internal bus 65 by the CPU 61 as required. The disk device 57 may be for example a logical volume of the storage system 7 and stores the communication control program and/or route control program and/or flow amount management program and/or data management program or the like, which are programs for the exclusive use of the CPU 61 and/or control system information for the exclusive use of the CPU 61. The disk device 57 therefore cannot be accessed from the user end (client 1).

Under the control of the CPU 61, the main memory device 59 reads for example the communication control program and/or route control program and/or flow amount management program and/or data management program that are loaded from the disk device 57 through the internal bus 65. The communication control program and/or route control program and/or flow amount management program and/or data management program or the like are executed by the CPU 61 on the main memory device 59.

The CPU 61 controls the various units constituting the storage system 7 (i.e. the control device 55, disk device 57 and main memory device 59).

The display device 9 comprises a display for displaying various types of information such as image information that is output from the client 1 in the form of a visible image and a key operating unit for inputting various types of information (including image information) to the client 1 and has the function of a man-machine interface between the user and the client.

Figure 2:
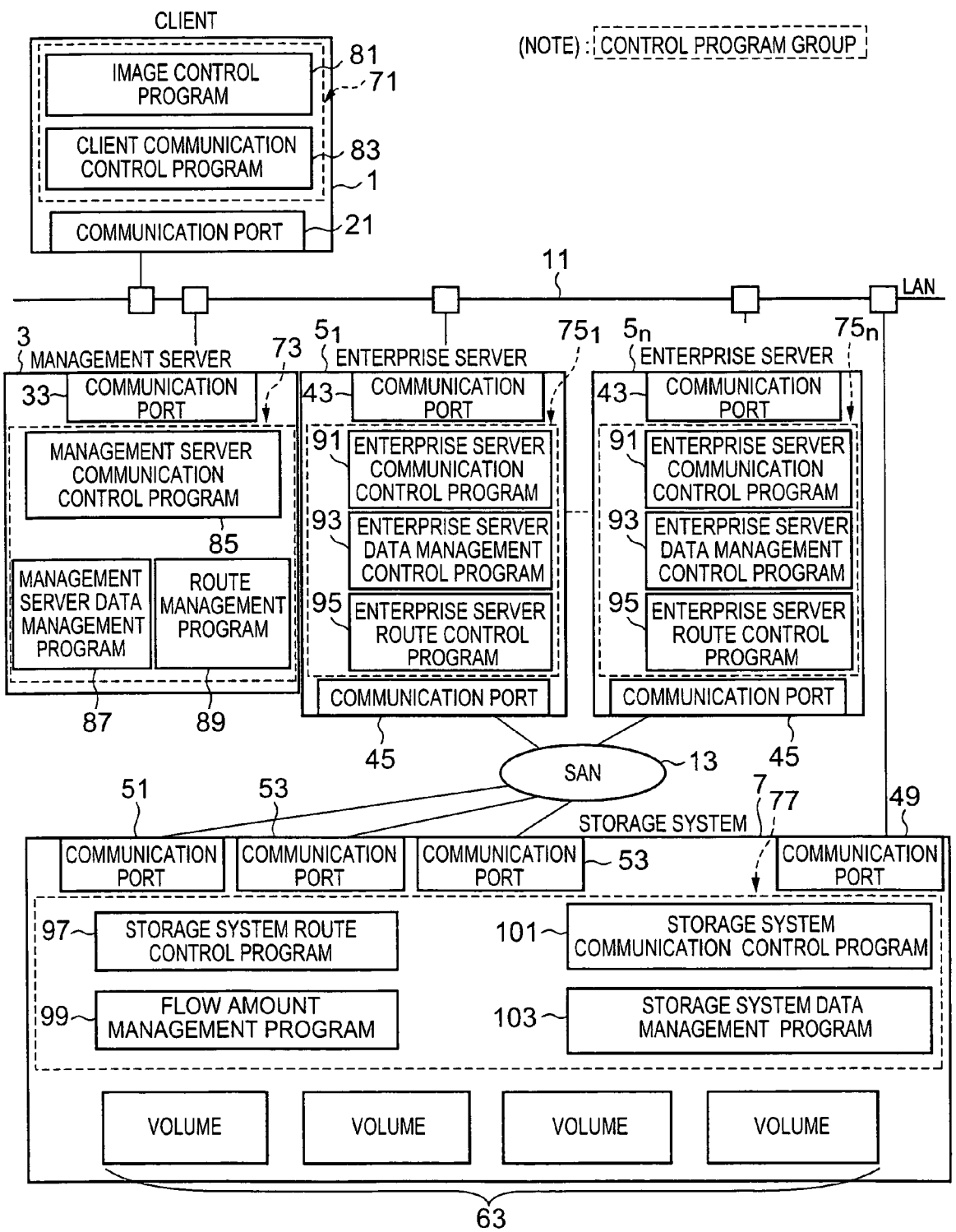
FIG. 2 is a functional block diagram showing groups of control programs loaded in various units constituting an information processing system comprising a storage system as shown in FIG. 1.

FIG. 2 is a functional block diagram showing control program groups loaded in the various units constituting the information processing system comprising a storage system as shown in FIG. 1.

The control program groups shown in FIG. 2 are of four types, namely, a control program group 71 that is loaded on the client 1, a control program group 73 that is loaded on the management server 3, control program groups $75_1$ to $75_n$ that are respectively loaded on the plurality of enterprise servers $5_1$ to $5_n$, and a control program 77 that is loaded on the storage system 7. It should be noted that the enterprise servers $5_1$ to $5_n$ are all of the same hardware construction and the control program groups $75_1$ to $75_n$ (that are respectively loaded on the enterprise servers $5_1$ to $5_n$) also all have the same function. Accordingly, regarding the control program groups $75_1$ to $75_n$, a detailed description will be given only regarding the control program group $75_1$ and a detailed description regarding the remaining control program groups (($75_2$) to $75_n$) will be omitted. Also, in FIG. 2, items which are the same as items illustrated in FIG. 1 are given the same reference symbols and further detailed description thereof is omitted.

The control program group 71 comprises an image control program 81 and a client communication control program 83.

The image control program 81 is a program for controlling for example input of for example image information to the display device 9 and/or input of various types of information from the display device 9 in respect of the image control device 23 (shown in FIG. 1). The client communication control program 83 is a program for giving instructions for connection or disconnection or sending/receiving information with respect to the management server 3 and enterprise servers ($5_1$ to $5_n$), which are the communication partners for information communication of the client 1, through the communication port 21 and LAN 11.

The control program group 73 comprises a management server communication control program 85, a management server data management program 87 and a route management program 89. The management server communication control program 85 has functions substantially the same as those of the client communication control program 83 included in the control program group 71. Specifically, the management server communication control program 85 is a program for giving instructions for connection or disconnection or sending/receiving of information with respect to any of the client 1, enterprise server $5_1$ and storage system 7, that are the communication partners for information communication of the management server 3, through the communication port 33 and LAN 11.

The data management program 87 gives instructions for issuing information acquisition requests in respect of the management server communication control program 85 or in respect of the storage system 7, in accordance with information acquisition requests whose subject is the storage system 7, that are transmitted through LAN 11 and communication port 33 from (the client communication control program 83 of) the client 1. The management server data management program 87 compiles in the form of a storage system management table (to be described in detail below) the results obtained from the management server communication control program 85 (i.e. for example information obtained from the storage system 7 by the management server communication control program 85), in accordance with the above instructions. This storage system management table is then stored on the disk device 27 (shown in FIG. 1).

When the storage management table has been stored in the disk device 27, the management server data management program 87 gives instructions, every time a fixed time elapses (i.e. at prescribed time intervals) for issuing acquisition requests regarding the amount of traffic in respect of the storage system 7, in respect of the management server communication control program 85. The management server data management program 87 reflects the results (i.e. for example the information acquired from the storage system 7 by the management server communication control program 85) that are provided from the management server communication control program 85 in response to these instructions to a traffic amount management table (to be described in detail later) that is stored on the disk device 27.

The management server data management program 87 gives instructions for issuing information acquisition requests whose subject is the enterprise server $5_1$ in respect of the management server communication control program 85, based on information acquisition requests from the enterprise server $5_1$ transmitted through the LAN 11 and communication port 33 from (the client communication control program 83 of) the client 1. The management server data management program 87 compiles in the form of an enterprise server management table (to be described in detail below) the results obtained from the management server communication control program 85 (i.e. for example information obtained from the enterprise server $5_1$ by the management server communication control program 85), in accordance with the above instructions. This enterprise server management table is then stored on the disk device 27 (shown in FIG. 1).

The management server data management program 87, in accordance with instructions from the route management program 89, references and updates the tables (i.e. the storage system management table, the traffic amount management table, and the enterprise server management table) described above that are stored on the disk device 27 (shown in FIG. 1).

The route management program 89 is a program for selecting a connection route (communication route) for performing information communication between the storage system 7 and enterprise server $5_1$ in response to a (communication) route connection request for performing information communication that is transmitted through the LAN 11 and communication port 33 from (the client communication control program 83 of) the client 1. The method of selecting this connection route that is performed by the route management program 89 will be described in detail later.

A communication route will now be described. In this embodiment, a communication route (alternatively sometimes referred to hereinbelow merely as a "route") does not imply the existence of an actual physical object such as the communication ports (21-53) shown in FIG. 1 and FIG. 2 but is merely a logical concept (logical communication route) constructed through the LAN 11 or SAN 13. In connection/disconnection of communication routes, control can therefore be exercised by software such as for example the route management program 89. In control relating to connection/disconnection of a communication route, the technique may be adopted of identifying the communication route of the data (information) by attaching an ID to the data (information) that is sent/received during route connection between for example the connection source device and the connection destination device and by attaching the same ID to data (information) that is subsequently sent/received.

The route management program 89 gives instructions to the management server communication control program 85 for issuing a request for connection of a communication route that is needed in order to perform information communication and/or request for alteration of the connection (communication) route from the enterprise server $5_1$ to the storage system 7. The route management program 89 reflects the results that are provided from the management server communication control program 85 in response to a request for connection of the communication route for which instructions were given to the management server communication control program 85 or a request for alteration of the connection (communication) route to a route management table (described in detail subsequently) that is stored on the disk device 27 (shown in FIG. 1).

The control program group $75_1$ comprises an enterprise server communication control program 91, an enterprise server data management program 93 and an enterprise server route control program 95. The enterprise server communication control program 91 has substantially the same function as the client communication control program 83 included in the control program group 71 and/or the management server communication control program 85 included in the control program group 73. Specifically, the enterprise server communication control program 91 is a program for giving instructions for connection or disconnection or sending/receiving information in respect of any of the client 1 and management server 3, constituting the communication partners for information communication of the enterprise server $5_1$ through the communication port 43 and LAN 11. The enterprise server communication control program 91 is also a program for giving instructions for connection or disconnection or sending/receiving of information in respect of the storage system 7, which is a communication partner for information communication of the enterprise server $5_1$, through the communication port 45 and SAN 13.

The enterprise server management program 93 is a program for giving instructions to the enterprise server communication control program 91 to reference the enterprise server management table stored in the disk device 37 (shown in FIG. 1) and regarding the reference results to be reported to the management server 3, in accordance with an information acquisition request transmitted through the LAN 11 and communication port 43 from (the management server communication control program 85 of) the management server 3.

The enterprise server route control program 95 is a program for performing route connection in accordance with communication means (for example, a prescribed communication protocol) with the storage system route control program 97 that is loaded in the storage system 7 and that is specified beforehand between these two.

The control program group 77 comprises a storage system route control program 97, a flow amount management program 99, a storage system communication control program 101, and a storage system and data management program 103. The storage system route control program 97 is a program having the same function as the enterprise server route control program 95 in the control program group $75_1$. Specifically, the storage system route control program 97 is a program that performs route connection (communication) in accordance with communication means (for example a prescribed communication protocol) with the enterprise server route control program 95 that is loaded on the enterprise server $5_1$ and that is specified beforehand between these two.

The flow amount management program 99 incorporates the information communication amounts for each of the communication ports 49, 51, 53. The flow amount management program 99 calculates the amount of traffic in respect of the storage system 7 in accordance with the information communication amount for each of the communication ports 49, 51, 53 incorporated by the flow amount management program 99, in accordance with an acquisition request of the amount of traffic in respect of the storage system 7 transmitted through the LAN 11 and communication port 49 from (the management server communication control program 85 of) the management server 3. It then gives instructions to the storage system communication control program 101 to transmit the calculated traffic amount to the management server 3. The method of calculating the amount of traffic in respect of the storage system 7 employed by the flow amount management program 99 will be described in detail later.

The storage system communication control program 101 has substantially the same function as the client communication control program 83 included in the control program group 71 or the management server communication control program 85 included in the control program group 73 or the enterprise server communication control program 91 included in the control program group $75_1$. Specifically, the storage system communication control program 101 is a program for giving instructions for connection or disconnection or sending/receiving information in respect of the management server 3, which is a communication partner for information communication of the storage system 7, through the communication port 49 and LAN 11. The storage system communication control program 101 is also a program for giving instructions for connection or disconnection or sending/receiving information in respect of the enterprise server $5_1$, which is a communication partner for information communication of the storage system 7, through the communication port 51/communication port 53 and SAN 13.

The storage system data management program 103 is a program for giving instructions to the storage system communication control program 101 to reference the storage system management table stored on the disk device 57 (shown in FIG. 1) and regarding the reference results to be reported to the management server 3, in accordance with an information acquisition request transmitted through the LAN 11 and communication port 49 from (the management server communication control program 85 of) the management server 3.

The user can make a request for acquisition of information regarding the communication ports 49, 51, 53 provided by the storage system 7 or a request for acquisition of information regarding the communication ports 43, 45 provided on the enterprise server $5_1$ to the management server 3 through the client 1, by operating the key operating unit of the display device 9 shown in FIG. 1. In addition, a request for route connection (communication) for connecting a route (communication) between the storage system 7 and the enterprise server $5_1$ can be made.

FIG. 3 is a diagram showing an example of a storage system management table provided on the management server 3 according to an embodiment of the present invention.

The storage system management table shown in FIG. 3 is stored in the disk device 27 of the management server 3 shown in FIG. 1. The storage system management table comprises a storage system identification information memory region 111 for storing storage system identification information, a communication port identification information memory region 113 for storing communication port identification information, and a maximum data transfer rate information memory region 115 for storing maximum data transfer rate information (units: MB/s).

The storage system identification information that is stored in the storage system identification information memory region 111 is information needed to respectively identify a plurality of storage systems that are provided in an information processing system according to an embodiment of the present invention (as already stated only a single storage system indicated by the reference symbol 7 is shown in FIG. 1). In the example shown in FIG. 3, the storage system indicated by the reference symbol 7 in FIG. 1 is stored in the storage system identification information memory region 111 as the storage system 1.

The communication port identification information stored in the communication port identification information memory region 113 is information necessary for respectively identifying the plurality of communication ports that are provided in the above storage systems. In the example illustrated in FIG. 3, communication ports indicated by the reference symbols 49, 51, 53, . . . in FIG. 1 and FIG. 2 are stored in the communication port identification information memory region 113 respectively as port 1, port 2, port 3, port 4 and port 5, . . . .

The maximum data transfer rate information stored in the maximum data transfer rate information memory region 115 is information relating to the maximum data transfer rate for each communication port identified by the communication port identification information (port 1 to port 5, . . . ). In the example illustrated in FIG. 3, 100 Mb/s is stored as the maximum data transfer rate in the maximum data transfer rate information memory region 115 respectively in regard to the port 1, port 2 and port 4; 200 Mb/s is stored in regard to the port 3 and 300 Mb/s is stored in regard to the port 5.

FIG. 4 is a diagram showing an example of a storage system management table provided in a storage system 7 according to an embodiment of the present invention.

The storage system management table shown in FIG. 4 is stored in the disk device 57 of the storage system 7 shown in FIG. 1.

The storage system management table shown in FIG. 4 differs from the storage system management table shown in FIG. 3 solely in regard to the fact that it is not provided with the storage system identification information memory region 111 shown in FIG. 3. Accordingly, in the storage system management table shown in FIG. 4, items that are the same as items shown in FIG. 3 are indicated by the same reference symbols and a detailed description thereof is omitted.

FIG. 5 is a diagram showing an example of an enterprise server management table provided in a management server 3 according to an embodiment of the present invention.

The enterprise server management table shown in FIG. 5 is stored in the disk device 27 of the management server 3 shown in FIG. 1. The enterprise server management table comprises an enterprise server identification information memory region 121 for storing enterprise server identification information and a communication port identification information memory region 123 for storing communication port identification information.

The enterprise server identification information stored in the enterprise server identification information memory region 121 is information necessary for identifying respective enterprise servers of the plurality of enterprise servers (specifically, the enterprise servers $5_1$ to $5_n$ shown in FIG. 2) that are provided in the information processing system according to an embodiment of the present invention. In the example shown in FIG. 5, the enterprise servers indicated by the reference symbols $5_1$ to $5_n$ in FIG. 1 are stored in the enterprise server identification information memory region 121 as enterprise server 1, enterprise server 2, enterprise server 3, . . . .

The communication port identification information stored in the communication port identification information memory region 123 is information necessary for identifying respective communication ports of the one or more communication ports that are provided by the enterprise servers $5_1$ to $5_n$. In the example illustrated in FIG. 5, the three communication ports possessed by the enterprise server identified as enterprise server 1 in the enterprise server identification information memory region 121 are stored in a memory region corresponding to the enterprise server 1 in the communication port identification information memory region 123 respectively as port a, port b and port c. Also, a single communication port possessed by the enterprise server identified as enterprise server 2 in the enterprise server identification information memory region 121 is stored in the memory region corresponding to the enterprise server 2 in the communication port identification information memory region 123 as the port d. In addition, a single communication port possessed by the enterprise server identified as the enterprise server 3 in the enterprise server identification information memory region 121 is stored in the memory region corresponding to the enterprise server 3 in the communication port identification information memory region 123 as the port e.

FIG. 6 is a diagram showing an example of an enterprise server management table provided at the enterprise servers ($5_1$ to $5_n$) according to an embodiment of the present invention.

The enterprise server management table 124 shown in FIG. 6 is stored in the disk device (37) of a single enterprise server identified as enterprise server 1 in the management server 3, of the plurality of enterprise servers ($5_1$ to $5_n$) shown in FIG. 2.

As is clear by comparing FIG. 6 and FIG. 5, the content of the enterprise server management table 124 shown in FIG. 6 is included in the enterprise server management table shown in FIG. 5. A detailed description relating to the content of the enterprise server management table 124 shown in FIG. 6 is therefore omitted.

FIG. 7 is a diagram showing an example of the amount of traffic management table for managing the amount of traffic to the storage system 7 that is provided on the management server 3 according to an embodiment of the present invention.

The traffic amount management table shown in FIG. 7 is stored on the disk device 27 of the management server 3 shown in FIG. 1. The traffic amount management table comprises a communication port identification information memory region 125 for storing communication port identification information and a traffic amount information memory region 127 for storing traffic amount information (units: MB/s).

The communication port and identification information stored in the communication port identification information memory region 125 is information necessary for identifying respective communication ports of the plurality of communication ports provided by the storage systems. In the example shown in FIG. 7, the communication ports indicated by the reference symbols 49, 51, 53, . . . in FIG. 1 and FIG. 2 are respectively stored in the communication port identification information memory region 125 as port 1, port 2, port 3, port 4 and port 5 . . . .

The traffic amount information stored in the traffic amount information memory region 127 gives the data flow amount (amount of data communication) in the time band from the time point where a traffic amount acquisition request is transmitted from the management server 3 to the storage system 7 up to the time point where the next traffic amount acquisition request is transmitted to the storage system 7 from the management server 3. In other words, the traffic amount information is information relating to the amount of use of a given communication port (or rate of data transfer) in a given time band.

In the example shown in FIG. 7, as is clear by comparing the communication port identification information memory region 125 and the traffic amount information memory region 127, in the case of the communication port identified as port 1, the amount of traffic is 10 Mb/s in the case of time band 1, 20 Mb/s in the case of time band 2, 30 MB/s in the case of time band 3, . . . , and 40 Mb/s in the case of time band n. Next, in the case of the communication port identified as port 2, the amount of traffic is in each case 10 Mb/s in the case of the time bands: time band 1 to time band 3, . . . , and 70 Mb/s in the case of the time band n. Next, in the case of the communication port identified as port 3, the amount of traffic is in each case 50 Mb/s in the case of the time bands: time band 1 to time band n.

Next, in the case of the communication port identified as port 4, the amount of traffic is in each case 60 Mb/s in the case of the time bands: time band 1 to time band n. Furthermore, in the case of the communication port identified as port 5, the amount of traffic is in each case 70 Mb/s in the case of the time bands: time band 1 to time band n.

Figure 19:
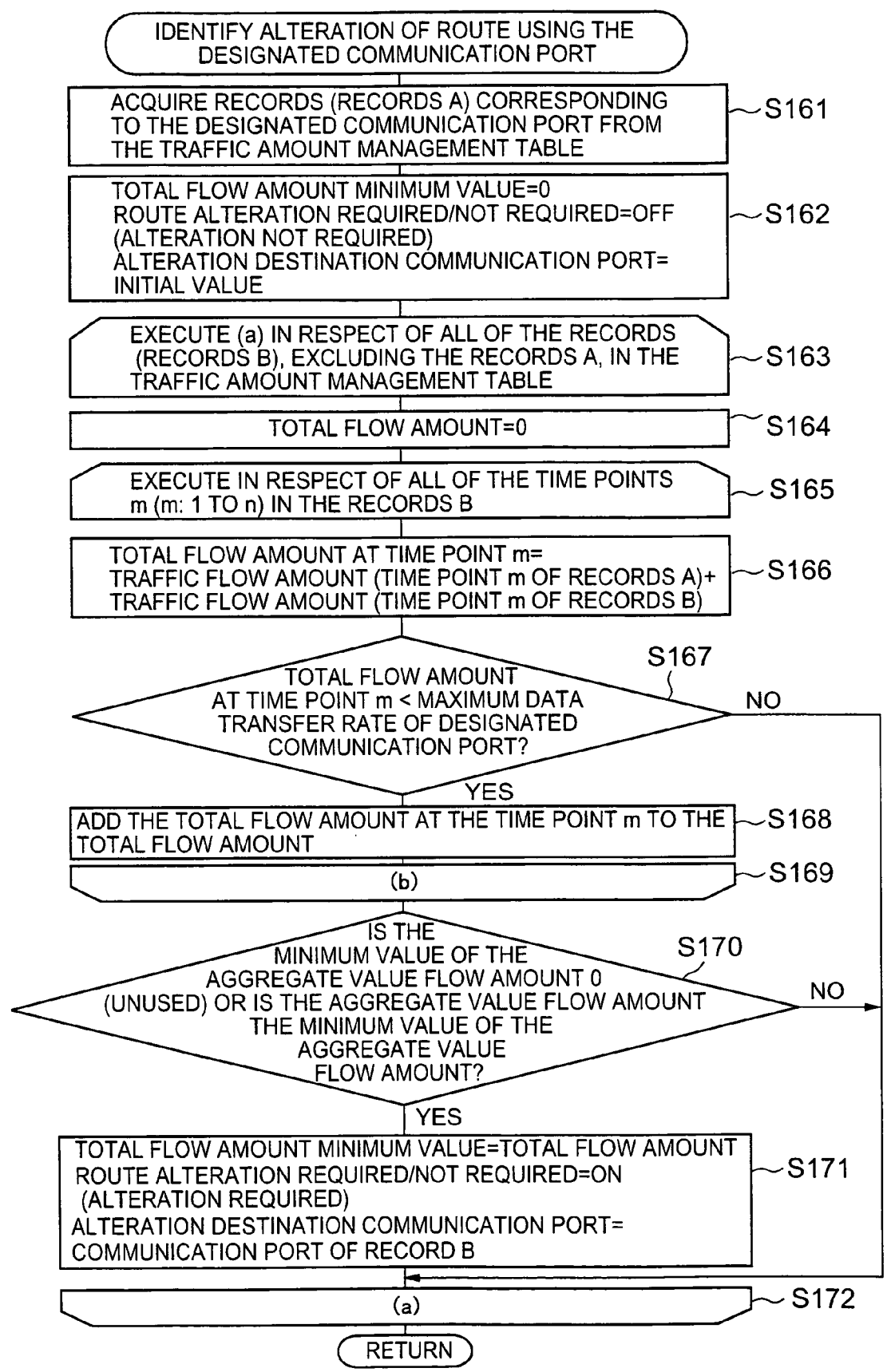
FIG. 19 is a flow chart showing an example of a subroutine of the processing action shown in FIG. 18 performed by a route management program provided at a management server.

It should be noted that, in FIG. 7, the row (record) indicated by the reference symbol 126 corresponds to the record A of FIG. 19, to be described, and the plurality of rows (records) indicated by the reference symbol 128 respectively correspond to the records B of FIG. 19.

FIG. 8 is a diagram showing an example of a route management table provided by the management server 3 according to an embodiment of the present invention.

The route management table shown in FIG. 8 is stored on a disk device 27 of the management server 3 shown in FIG. 1. The route management table comprises a storage system communication port identification information memory region 129 for storing communication port identification information at the storage system 7 (provided by the storage system 7) and an enterprise server communication port identification information memory region 131 for storing communication port identification information provided at the enterprise server 5 (provided by the enterprise server 5).

The communication port identification information that is stored in the storage system of communication port identification information memory region 129 is information required for identifying respective communication ports of the plurality of communication ports provided by the storage systems. In the example shown in FIG. 8, in FIG. 1 and FIG. 2, the communication ports indicated by the reference symbols 49, 51, 53, . . . are stored in the storage system communication port identification information memory region 129 as port 1, port 2, port 3, . . . , respectively. In other words, the storage content of the storage system communication port identification information memory region 129 corresponds to the storage content of the communication port identification information memory region 113 of the storage system management table shown in FIG. 4.

The communication port identification information stored in the enterprise server communication port identification information memory region 131 is information that is required for identifying respective communication ports respectively possessed by the plurality of enterprise servers ($5_1$ to $5_n$) provided by the information processing system according to an embodiment of the present invention. In the example shown in FIG. 8, the communication ports indicated by the reference symbols 43, 45, . . . in FIG. 2 are stored in the enterprise server communication port identification information memory region 131 as port a, port b, port c, port d and port e . . . , respectively. In other words, the storage content of the enterprise server communication port identification information memory region 131 corresponds to the storage content of the communication port identification information memory region 123 of the enterprise server management table shown in FIG. 5.

It should be noted that, in the example illustrated in FIG. 8, as is clear from the drawing, port a, port b and port c in the enterprise server communication port identification information memory region 131 are associated with the ports 1 in the storage system communication port identification information memory region 129. Also, the port d in the enterprise server communication port identification information memory region 131 is associated with the port 2 in the storage system communication port identification information memory region 129 and the port e in the enterprise server communication port identification information memory region 131 is associated with the port 3 in the storage system communication port identification information memory region 129, respectively.

The management server 3 compares the storage content of the storage system communication port identification information memory region 129 of the route management table shown in FIG. 8 with the storage content of the communication port identification information memory region 113 of the storage system management table shown in FIG. 4 and, if a communication port that is not registered in the storage system communication port identification information memory region 129 exists in the communication port identification information memory region 113 of the storage system management table, makes it possible to identify this communication port as an unused communication port (free port).

Figure 9:
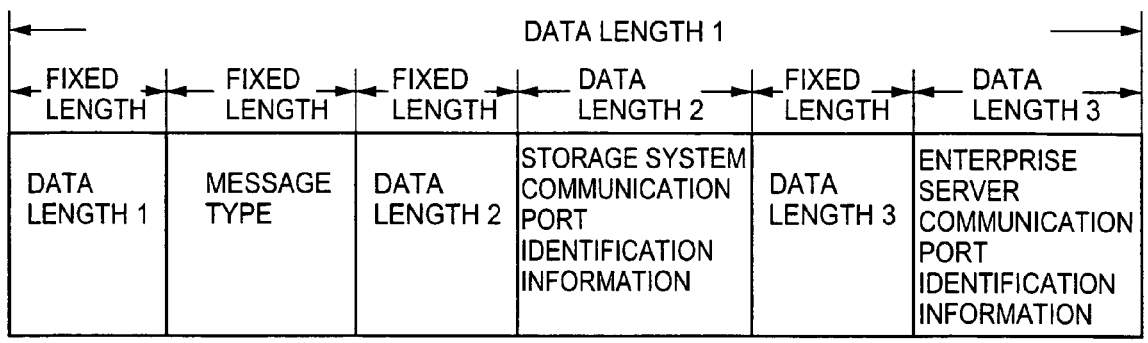
FIG. 9 is a diagram showing an example of a request message for route connection/route alteration that is transmitted to a management server from a client.

FIG. 9 is a diagram showing an example of a route connection/route alteration request message that is transmitted to the management server 3 from a client 1.

As shown in FIG. 9, the route connection/route alteration request message includes the various types of data: data length 1, message type, data length 2, storage system communication port information, data length 3, and enterprise server communication port information. The data length 1 shows the amount of data of this entire request message for route connection/route alteration and is data of fixed length. The message type is data of fixed length for identifying whether the above request message is a request message for route connection or a request message for route alteration. The data length 2 is data of fixed length and shows the amount of data of the storage communication port identification information. The storage system communication port identification information indicates for example information corresponding to the storage content of the storage communication port identification information memory region 129 shown in FIG. 8. The data length 3 is data of fixed length and shows the amount of data of the enterprise server communication port identification information. The enterprise server communication port identification information indicates information corresponding to the storage content of the enterprise server communication port identification information memory region 131 shown in FIG. 8.

Figure 10:
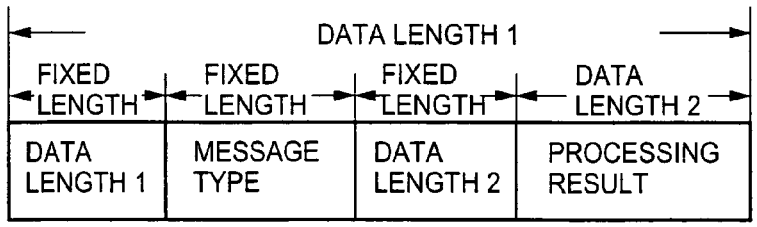
FIG. 10 is a diagram showing an example of a response message for route connection/route alteration that is transmitted to a client from a management server.

FIG. 10 is a diagram showing an example of a response message of route connection/route alteration transmitted to the client 1 from the management server 3.

As shown in FIG. 10, the route connection/route alteration response message includes the data: data length 1, message type, data length 2 and processing result. The data length 1 shows the amount of data of this entire response message of route connection/route alteration and is data of fixed length. The message type is data of fixed length for identifying whether this request message is a route connection response message or a route alteration response message. The data length 2 is fixed length data and shows the amount of data of the processing result. The processing result indicates information expressing the result of the content of processing that has been executed by (the route management program 89 of) the management server 3 in accordance with the request message for route connection/route alteration from the client 1.

Figure 11:
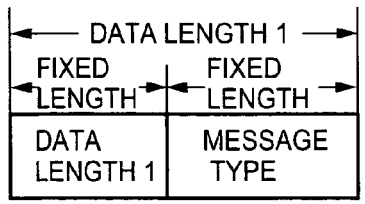
FIG. 11 is a diagram showing an example of an information acquisition request message that is transmitted to an enterprise server or storage system from a management server.

FIG. 11 is a diagram showing an example of an information acquisition request message that is transmitted to the enterprise server 5 or storage system 7 from the management server 3.

The information acquisition request message, as shown in FIG. 11, includes data length 1 and message type. The data length 1 shows the amount of data of this entire information acquisition request message and is data of fixed length. The message type is data of fixed length for identifying whether the information acquisition request message is a message in respect of the enterprise server 5 or is a message in respect of the storage system 7.

Figure 12:
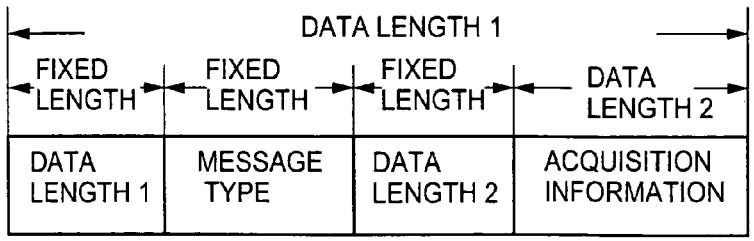
FIG. 12 is a diagram showing an example of an information acquisition response message that is transmitted from an enterprise server or storage system to a management server.

FIG. 12 is a diagram showing an example of an information acquisition response message that is transmitted to the management server 3 from the enterprise server 5 or storage system 7.

As shown in FIG. 12, the information acquisition response message includes data length 1, message type, data length and acquisition information. The data length 1 is data of fixed length showing the total amount of data of this entire information acquisition response message. The message type is data of fixed length for identifying whether this information acquisition response message is transmitted from the enterprise server 5 or this transmitted from the storage system 7. The data length 2 is data of fixed length showing the amount of data of the acquisition information. The acquisition information, as shown for example in FIG. 6, indicates information corresponding to the storage content of the enterprise server management table that is provided by the enterprise server 5, or information corresponding to the storage content of the storage management table that is provided by the storage system 7 shown by way of example in FIG. 4.

FIG. 13 is a diagram showing an example of the internal information possessed by the flow amount management program 99 that is loaded in the storage system 7. The internal information shown in FIG. 13 is for example arranged on a disk device 57 of the storage system 7.

As shown in FIG. 13, this internal information includes the time point: tA [s] at which a traffic amount acquisition request transmitted from the management server 3 was received on the previous occasion and the time point: tB [s] at which a traffic amount acquisition request transmitted from the management server 3 was received on the present occasion. This internal information includes: the cumulative value of the amount of data communication on the port 1 (i.e. the cumulative value from the arrival of the Nth request from the management server 3 up until the arrival of the next i.e. N+1 th request. The same convention is used hereinbelow): d1 [MB]; the cumulative value of the amount of data communication on the port 2: d2 [MB]; . . . ; and the cumulative value of the amount of data communication on the port n: dn [MB]. As already stated, the ports identified as port 1, port 2, . . . , port n are in each case communication ports provided by the storage system 7.

FIG. 14 is a diagram showing an example of a calculation expression for calculation of the amount of traffic on each communication port provided by the storage system 7.

In FIG. 14, the amount of traffic at the communication port identified as port 1 can be expressed by d1/(tA−tB) [MB/s], the amount of traffic at the communication port identified as port 2 can be expressed by d2/(tA-tB) [MB/s], . . . , and the amount of traffic at the communication port identified as port n can be expressed by dn/(tA−tB) [MB/s], respectively. d1, d2, . . . , dn are the cumulative values of the amounts of data communication at the port 1, port 2, . . . , port n respectively shown in FIG. 13, tA is the time point at which a traffic amount acquisition request was received that was transmitted from the management server 3 on the previous occasion and tB is the time point at which the traffic amount acquisition request that was transmitted from the management server 3 was received on the present occasion.

FIG. 15 is a diagram showing the process of cumulative value calculation of the amount of data communication to the storage system 7 from the enterprise server 5 through a specific communication port (in the case of the example shown in FIG. 2, either of the communication ports indicated by the reference symbols 51, 53) provided by the storage system 7.

The calculation of the cumulative value of the data communication amount is commenced by the flow amount management program 99 in the storage system 7 at the time point $t_1$ at which a traffic amount acquisition request was issued in respect of the storage system 7 from the management server 3. The cumulative value of the data communication amount is "0" at the time point $t_1$ but, at the time point where 10 Mb of data have been transmitted to the storage system 7 through the specified communication port from the enterprise server 5, becomes "10" and, at the time point where 20 Mb of data have been transmitted, becomes "30". Next, at the time point where 10 Mb of data have been transmitted to the storage system 7 through the specified communication port from the enterprise server 5, the cumulative value of the data communication amount becomes "40" and, further, at the time point where 30 Mb of data have been transmitted, becomes "70".

On arriving at the time point $t_2$, the cumulative value "70" of the data transmission amount is reset by issuance of a new traffic amount acquisition request in respect of the storage system 7 from the management server 3.

After issuance of a traffic amount acquisition request from the management server 3 at a given time point, the storage system 7 (flow amount management program 99) transmits to the management server 3 as the traffic amount a value obtained by dividing the cumulative value ("70" in the case of this example) of the data communication amount in the time band until the next issuance of a traffic amount acquisition request from the management server 3 by this time band.

FIG. 16 is a diagram showing the process of deciding on alteration when altering the connection destination in the storage system 7 of a communication route that is connected between the enterprise server 5 and the storage system 7 from a given communication port to another communication port, in accordance with the traffic amount management table (shown in FIG. 7).

The decision to alter the communication port that is the connection destination in the storage system 7 in order to connect the enterprise server 5 and the storage system 7 in accordance with this traffic amount management table is performed by the management server 3.

As shown in FIG. 16(*a*), in this process of deciding on alteration, first of all, the aggregate value of the total values of the traffic amounts at the time points (1, 2, 3, ..., n) of the port 1 which is the connection destination of the current communication route and the total values of the traffic amounts at the time points (1, 2, 3, ..., n) of the port 2, which is not the current connection destination of the communication route, are found. In FIG. 16(*a*), the total values of the traffic amounts of the port 1 and the port 2 are both 100, so the aggregate value of the total value of the port 1 and the total value of the port 2 is 200; the maximum value of the total values of the port 1 and the port 2 at the time point m is 110.

Since, from FIG. 16(*a*), the maximum data transfer rate at the port 2 is 100, it is clear that the above total value (110) at the time point m exceeds this maximum data transfer rate (100). The port 2 is therefore excluded from ports that may constitute connection destinations in the storage system 7.

Next, as shown in FIG. 16(*b*), the aggregate value of the total value of the traffic amount at the time points (1, 2, 3, ..., n) of the port 1 (which is the current connection destination of the communication route) and the total value of the traffic amounts at the time points (1, 2, 3, ..., n) of the port 3, which is not the current connection destination of the communication route, is found. In FIG. 16(*b*), the total value of the traffic amount at the port 1 is 100 and the total value of the traffic amount at the port 3 is 200; thus the aggregate value of the total value of the port 1 and the total value of the port 3 is 300; the maximum value of the total values of the port 1 and the port 3 at the time point m is 90.

Now from FIG. 16(*b*), the maximum data transfer rate at the port 3 is 200, so it is clear that the above total value (90) at the time point m is smaller than the maximum data transfer rate (200). The port 3 is therefore a candidate for a port that may constitute a connection destination in the storage system 7.

Next, as shown in FIG. 16(*c*), the aggregate value of the total value of the traffic amount at the time points (1, 2, 3, ..., n) of the port 1 (which is the current connection destination of the communication route) and the total value of the traffic amounts at the time points (1, 2, 3, ..., n) of the port 4, which is not the current connection destination of the communication route, is found. In FIG. 16(*c*), the total value of the traffic amount at the port 1 is 100 and the total value of the traffic amount at the port 4 is 240; thus the aggregate value of the total value of the port 1 and the total value of the port 4 is 340; the maximum value of the total values of the port 1 and the port 4 at the time point m is 100.

Now from FIG. 16(*c*), the maximum data transfer rate at the port 4 is 100, so the total value (100) at the time point m and the maximum data transfer rate (100) are equal. Accordingly, the port 4 is also a candidate for a port that may constitute a connection destination in the storage system 7.

Furthermore, as shown in FIG. 16(*d*), the aggregate value of the total value of the traffic amount at the time points (1, 2, 3, ..., n) of the port 1 (which is the current connection destination of the communication route) and the total value of the traffic amounts at the time points (1, 2, 3, ..., n) of the port 5, which is not the current connection destination of the communication route, is found. In FIG. 16(*d*), the total value of the traffic amount at the port 1 is 100 and the total value of the traffic amount at the port 5 is 280; thus the aggregate value of the total value of the port 1 and the total value of the port 5 is 380; the maximum value of the total values of the port 1 and the port 5 at the time point m is 110.

Now from FIG. 16(*d*), the maximum data transfer rate at the port 5 is 300, so it is clear that the above total value (110) at the time point m is smaller than the maximum data transfer rate (300). The port 5 is therefore a candidate for a port that may constitute a connection destination in the storage system 7.

From the above process of deciding on alteration, the port that has the least aggregate value flow amount of the port 3, port 4 and port 5 that are candidates for a port that may constitute a connection destination in the storage system 7 is selected as the alteration port. In the example shown in FIG. 16, the port that has the least aggregate flow amount is the port 3, so the port 3 is selected as the new connection destination port in the storage system 7.

FIG. 17 is a diagram showing an example of an updating process when altering a connection destination of the storage system 7 of a communication route connected between an enterprise server 5 and the storage system 7 from a given communication port to another communication port, in the route management table (shown in FIG. 8). This updating is performed by the route management program 89 of the management server 3.

In FIG. 17, FIG. 17(*a*) shows the route management table prior to updating of the storage content and FIG. 17(*b*) shows the route management table after the storage content has been updated, respectively.

In the route management table prior to updating, as shown in FIG. 17(*a*), the communication port of the storage system 7 to which the port a, port b and port c of the enterprise server 5 are connected through the communication route is port 1 and the communication port of the storage system 7 to which the port d of the enterprise server 5 is connected through the communication route is port 2. In addition, the communication port of the storage system 7 to which the port e of the enterprise server 5 is connected through the communication route is port 3.

In contrast, as shown in FIG. 17(*b*), in the updated route management table, a (new) port f of the enterprise server 5 i.e.

a communication port of the storage system 7 that was not previously connected with the enterprise server 5, but that is now connected with a communication port of the enterprise server 5 through the communication route now that this enterprise server 5 has issued the new communication request, now constitutes port 1 (port 1 is opened for the enterprise server 5 that issued the new communication request). Concomitantly, the communication port of the storage system 7 that is connected through the communication route with the port a, port b and port c of the enterprise server 5, that were previously connected with the port 1 of the storage system 7, is now updated from port 1 to port 3. It should be noted that no updating takes place regarding the connection condition between the port d of the enterprise server 5 and the port 2 of the storage system 7 or between the port e of the enterprise server 5 and the port 3 of the storage system 7.

Figure 18:
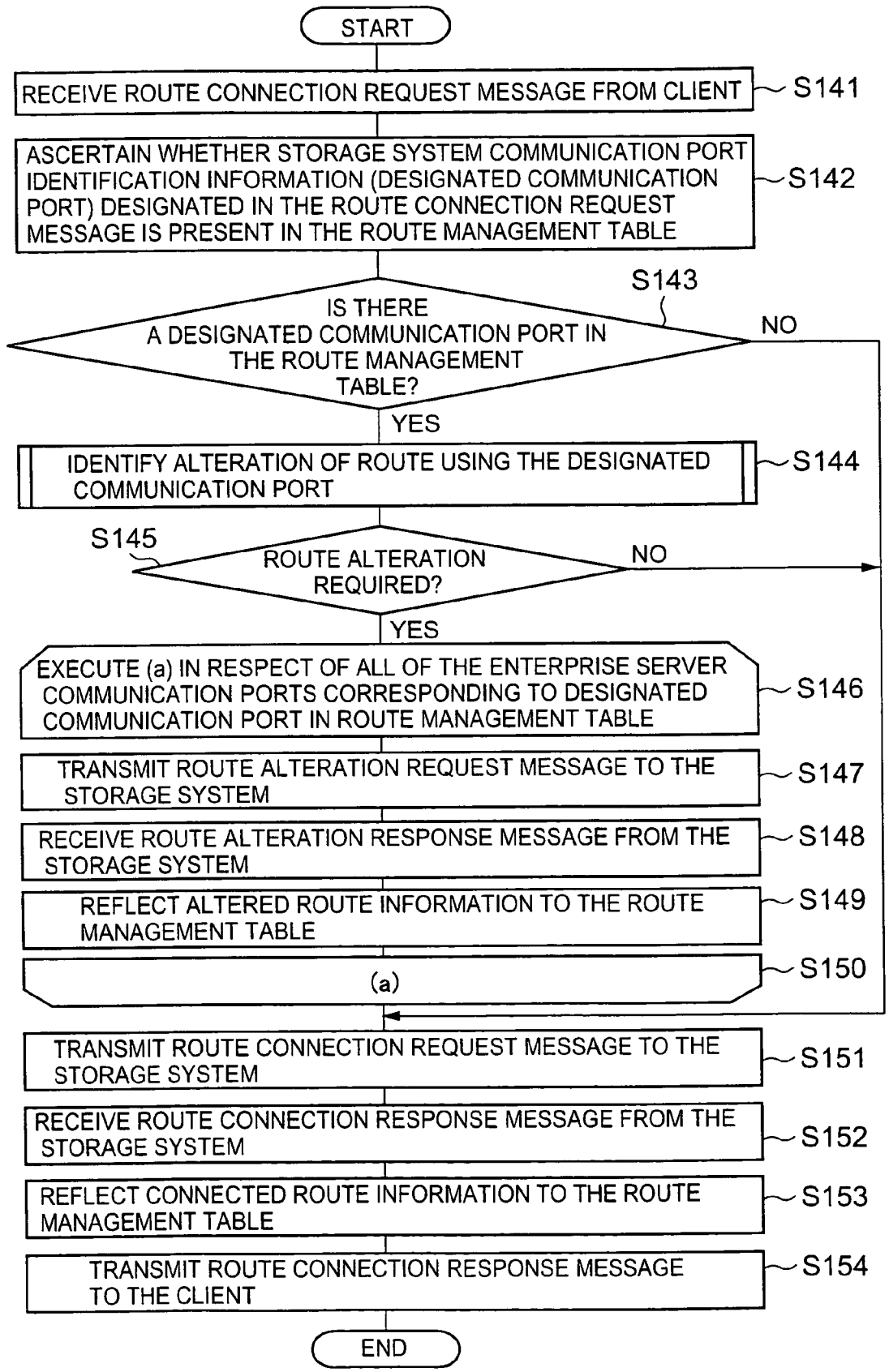
FIG. 18 is a flow chart showing an example of the processing action of a route management program provided at a management server.

FIG. 18 is a flow chart showing an example of the processing operation of a route management program 89 with which the management server 3 is provided.

In FIG. 18, on reception (step S141) of a route connection request message (shown in FIG. 9) from the client 1 by the management server 3, the route management program 89 checks to ascertain whether or not the storage system communication port identification information (designated communication port) designated by this route connection request message is present in the storage system communication port identification information memory region 129 in the route management table (shown in FIG. 8). In specific terms, the route management program 89 performs the aforesaid check (step S142) by retrieving from the enterprise server communication port identification information memory region 131 in the route management table a value coinciding with the enterprise server communication port identification information contained in the route connection request message.

If, as a result of this check, it is found that the designated communication port exists in the route management table (step S143 YES), processing shifts (step S144) to the processing flow (i.e. the processing flow set out in FIG. 11, which is a subroutine of the processing flow shown in FIG. 18) in which it is ascertained whether or not a communication route exists that employs this designated communication port. Next, after the execution of this processing flow, a check is made (step S145) to ascertain whether or not it is necessary to alter the communication route. If, as a result of this check, it is concluded that alteration of the communication route is necessary (YES in step S145), processing is executed for setting up a free port in respect of one or other of the plurality of communication ports at the storage system 7, in accordance with a new connection request in respect of the storage system 7 from the enterprise server (5), as shown in step S146 to step S150.

Specifically, the route management program 89 transmits (step S147) a route alteration request message in respect of (the storage system root control program 97 of) the storage system 7 and receives (step S148) a route alteration response message from the (storage system root control program 97 of the) storage system 7 that received this route alteration request message. In accordance with this route alteration response message which it has thus received, the route management program 89 then reflects the altered routing information to the route management table (step S149). The processing operations respectively indicated in step S147 to step S149 are executed (step S146) in respect of all of the items of enterprise server communication port identification information in the route management table (shown in FIG. 8).

When it is confirmed (step S150) that the processing operations respectively indicated in step S147 to S149 have been executed in respect of all of the items of enterprise server communication port identification information in the route management table (shown in FIG. 8), the route management program 89 then transmits a route connection request message (step S151) in respect of (the root control program) of the storage system 7. When this route alteration request message is received, the (storage system root control program 97 of the) storage system 7 transmits a route alteration response message and the route management program 89 receives this route alteration response message (step S152).

Next, in accordance with this route alteration response message that has thus been received, the route management program 89 reflects (step S153) the altered route information to the route management table and transmits (step S154) a route connection response message in respect of the client 1, thereby terminating the series of processing operations.

It should be noted that, if it is found (NO in step S143) that the storage system communication port identification information (designated communication port) designated by the route connection request message is not present in the storage system communication port identification information memory region 129 in the route management table (shown in FIG. 8), since the designated communication port is not currently being employed, processing immediately shifts to step S151. Also, if it is concluded that alteration of the communication route is not necessary (NO in step S145), processing immediately shifts to step S151.

FIG. 19 is a flow chart showing an example of a subroutine of the processing operation shown in FIG. 18 that is performed by the route management program 89 (provided at the management server 3). Specifically, the subroutine shown in FIG. 19 shows the processing flow (step S144 in FIG. 18) for determining the presence or absence of a communication route employed in the designated communication port.

In FIG. 19, the route management program 89 first of all acquires (step S161) a record (for example the record $A_0$ shown in FIG. 7 i.e. information regarding the traffic amount of the communication port of the storage system 7 identified as port 1) corresponding to the designated communication port referred to above from the traffic amount management table (shown in FIG. 7) (provided at the management server 3). Next, total flow amount minimum value=0, route alteration required/not required=OFF (i.e. alteration not required) and altered destination communication port=initial value are set as internal parameters of the route management program 89 (step S162).

Next, the processing operation respectively indicated in step S164 to step S171 is executed (step S163) in respect of all of the records (i.e. records B) excluding the records A in the traffic amount management table. First of all, the total flow amount is set=0 (the total flow amount is initialized) (step S164). Next, the respective processing operations indicated by step S166 to step S168 are executed (step S165) in respect of all of the time points m (m:1 to n) in the records B in the traffic amount management table. First of all, the total flow amount (total value) of the traffic flow amounts of the records A at the time point m and the traffic flow amount of the records B at the time point m is found (step S166). Next, a check is made to ascertain whether or not or the total flow amount (total value) of the traffic flow amount of the records A at the time point m and the traffic flow amount of the records B at the time point m is smaller than the maximum data transfer rate at the specified communication port referred to above (step S167).

If, as a result of the above check, it is found that the total flow amount of the traffic flow amounts of the records A and the records B at the time point m is less than the maximum data transfer rate at the specified communication port (YES in step S167) the program shifts to the processing operation indicated by the next step S168. That is, to the aggregate value of the total value of the traffic flow amount in the records A prior to the time point m being reached and the total value of the traffic flow amount in the records B prior to the time point m being reached, there is added (step S168) the total flow amount (total value) of the traffic flow amount of the records A at the time point m and the traffic flow amount of the records B at the time point m found in step S166.

Then, when it is confirmed (step S169) that the processing operations respectively indicated in the step S166 to step S168 have been executed in respect of all of the time points m (m:1 to n) in the records B in the traffic amount management table (shown in FIG. 7), processing shifts to the processing operation shown in the next step S170. Specifically, a check is made to ascertain whether or not the minimum value of the aggregate value flow amount is 0 (the records B that are the subject of the current check are not being used) or the aggregate value flow amount is the minimum value of the aggregate value flow amount (step S170). If, as a result of this check, it is concluded that the minimum value of the aggregate flow amount is 0 or the aggregate value flow amount is the minimum value of the aggregate value flow amount (YES in step S170), processing shifts to the processing operation indicated by the next step S171.

Next, in step S162, the internal parameters of the route management program 89: total flow amount minimum value=0, route alteration required/not required=OFF (i.e. alteration not required) and altered destination communication port=initial value are respectively altered (step S171) to total flow amount minimum value=total flow amount, route alteration required/not required=ON (i.e. alteration required) and altered destination communication port=communication port of record B.

It should be noted that, if it is concluded (NO in step S167) that the total flow amount (total value) of the traffic flow amount of the records A at the time point m and the traffic flow amount of the records B at the time point m is less than the maximum data transfer rate at the designated communication port mentioned above, processing shifts to the processing operation indicated by step S172. Also, if the minimum value of the aggregate value flow amount is not 0, if it is determined that the aggregate value flow amount is not the minimum value of the aggregate value flow amount, processing shifts to the processing operation shown in step S172.

If it is then confirmed (step S172) that the processing operations respectively indicated at step S164 to step S171 have been respectively executed in respect of all of the records (records B) except for the records A in the traffic amount management table (shown in FIG. 7), processing shifts to the processing operation indicated in step S145 shown in FIG. 18.

FIG. 20 is a diagram showing an example of the mode of alteration of connection destination of the communication route connected between the enterprise server and the storage system at a storage system according to an embodiment of the present invention.

Figure 20A:
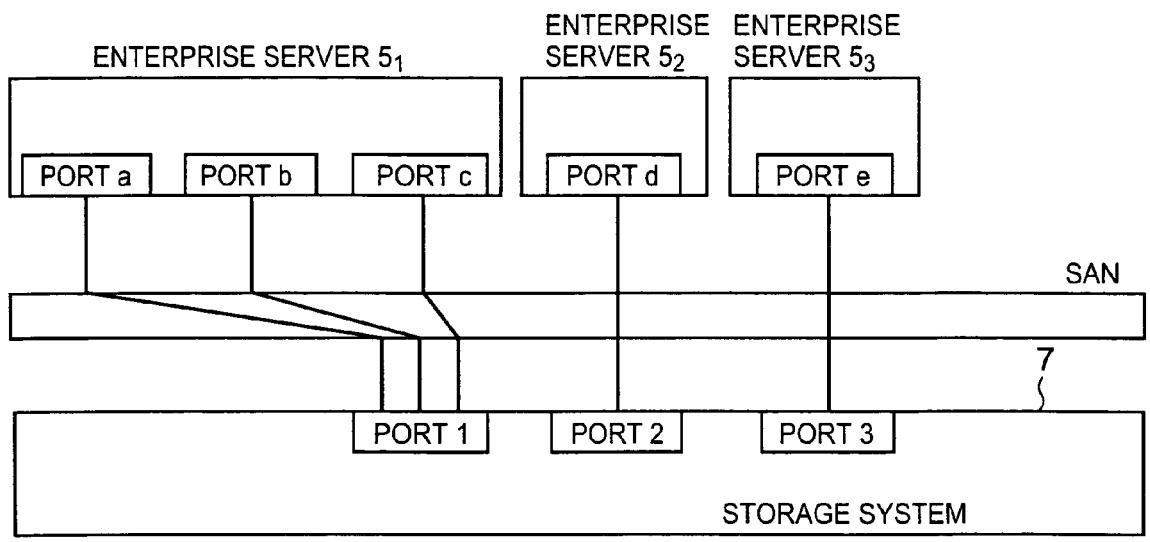
FIG. 20 is a diagram showing an example of a mode of connection destination alteration of a communication route connected between an enterprise server and a storage system in the storage system according to an embodiment of the present invention.
Figure 20B:
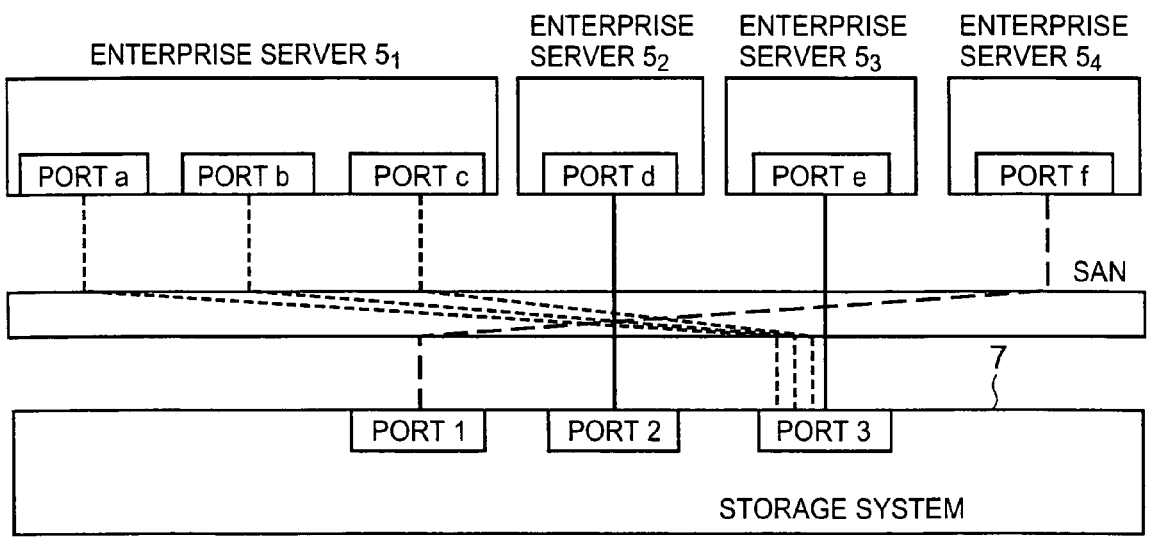

In FIG. 20, the communication routes connected between the enterprise servers ($5_1$ to $5_3$) and the storage system 7 are connected as shown in FIG. 20(a) prior to alteration of the communication port that constitutes the connection destination at the storage system 7 and are connected as shown in FIG. 20(b), respectively, after alteration of the communication port that constitutes the connection destination at the storage system 7. As is clear by comparing FIG. 20(a) and FIG. 20(b), prior to alteration, the port a, port b and port c of the enterprise server $5_1$ are each connected with the port 1 at the storage system 7 through the communication route.

However, when an enterprise server $5_4$ that has not yet been connected with the storage system 7 is connected with the storage system 7 in accordance with a new connection request, the communication port at the storage system 7 that is connected through the communication route respectively with the port a, port b and port c of the enterprise server $5_1$ is now altered from port 1 to port 3. The enterprise server $5_4$ is then connected through the communication route through the port f, which is its communication port, with the port 1, which has, by this alteration, become a free communication port of the storage system 7.

It should be noted that the connection relationship through the communication route between the enterprise server $5_2$ and the storage system 7 and the connection relationship through the communication route between the enterprise server $5_3$ and of the storage system 7 are the same as in the case of FIG. 20(a) and FIG. 20(b).

It should further be noted that, although the amount of traffic of the communication route of the enterprise server $5_1$ whose connection destination has been altered from port 1 to port 3 is a known value, the amount of traffic of the communication route of the enterprise server $5_4$ that it has been decided to connect with the port 1 in accordance with the new connection request is an unknown value. However, in this embodiment, as is clear from the description up to this point, this situation is dealt with by preparing a free port as the connection destination of the communication route of the enterprise server ($5_4$) relating to the new connection request as its communication port at the storage system 7.

Although in FIG. 20 the case of alteration of the communication route from a given port of the storage system to another port was illustrated in terms of enterprise server units, it would also be possible to effect such alteration of communication route from a given port of the storage system to another port in terms of enterprise server port units or in terms of communication route units. In this way, it would be possible to disperse the load by altering for example the port a of the enterprise server $5_1$ to port 2 of the storage system, and the port b and the port c of the enterprise server $5_1$ to the port 3 of the storage system.

In order to implement this, finding the traffic amount for each port of the storage system in FIG. 7 may be replaced by finding the traffic amount in communication route units. Specifically, the traffic amounts are found as the traffic amount of the port a of the enterprise server $5_1$ and the port 1 of the storage system, the traffic amount of the port b of the enterprise server $5_1$ and the port 1 of the storage system, and the traffic amount of the port c of the enterprise server $5_1$ and the port 1 of the storage system. Even if a plurality of communication routes are set up at other enterprise servers, the traffic amounts can be found in the same way for each communication route.

The processing shown in FIG. 18 and FIG. 19 is executed after finding the traffic amounts in this way.

Specifically, in FIG. 19, by finding the total flow amounts for each communication port, the other communication ports were found for which the total flow amount of the designated communication port and the other communication ports was a minimum, the aim being to find the other communication ports for which the total flow amount of the designated communication port communication route and the other communication ports is a minimum. For this purpose, the traffic amounts of all of the communication routes of the designated communication ports are acquired in step S161 of FIG. 19 and in step S163 to step S172 the total flow amounts of the traffic amounts of the communication routes and the other communication ports are found, and the least of these is selected. This processing is performed in respect of all the communication routes of the designated communication ports.

Figure 21:
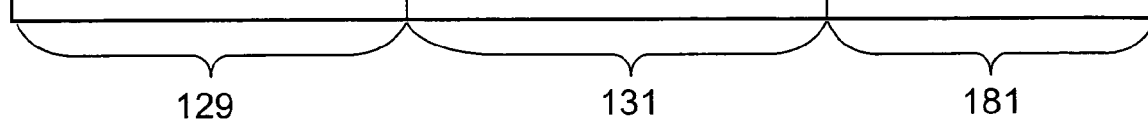
FIG. 21 is a diagram showing a modified example of a route management table according to an embodiment of the present invention.

FIG. 21 is a diagram showing a modified example of a route management table according to an embodiment of the present invention.

Like the route management table shown in FIG. 8, the route management table according to the present modified example comprises a storage system communication port identification information memory region 129 and enterprise server communication port identification information memory region 131 but differs from the route management table shown in FIG. 8 in that it further comprises a time band memory region 181. The time band information that is stored in the time band memory region 181 indicates the time band in which the connection relationship through the communication route between the communication ports of the storage system 7 and the communication ports of the enterprise server 5 stored in the route management table is realized.

The route management table shown in FIG. 21 stores the connection relationship through the communication routes between the communication ports of the storage system 7 and the communication ports of the enterprise server 5 in the time band "4". Also in the information processing system comprising a management server having a route management table as shown in FIG. 21, every time there is a new incoming connection request, the connection relationship through the communication routes between the communication ports of the storage system 7 and the communication ports of the enterprise server 5 is altered in accordance with the computational processing results by executing computational processing as already described. The connection relationship after alteration may therefore be returned to the connection relationship in the above-mentioned time band "4" at a given time point i.e. the connection relationship through the communication routes between the communication ports of the storage system 7 and the communication ports of the enterprise server 5 stored in the route management table shown in FIG. 21.

When this is done, it is necessary to ascertain whether it is in fact possible to return to the connection relationship shown in FIG. 21 from the results of computational processing, to be performed as already described.

It should be noted that, although it was assumed that the connection relationship through the communication routes between the communication ports of the storage system 7 and the communication ports of the enterprise server 5 held by the route management table shown in FIG. 21 was in respect of a single time band only (in the example shown in FIG. 21, the time band "4"), it would be possible to restore the connection relationship to any of respective time bands by arranging to hold the connection relationships in a plurality of time bands in the route management table.

In the embodiment described above and in the modified example thereof, every time a new connection request arrived, a designated communication port of the storage system 7 which had the smallest amount of traffic was arranged to be opened by computational processing as already described or, if this port was already open, this free communication port was directly employed for connection of a communication route for connection with the enterprise server. Or, instead, when for example a new connection request is received, it may be arranged to ascertain which communication port of the plurality of communication ports possessed by the storage system 7 is open and to keep this communication port that has thus been identified open for the enterprise server, should the enterprise server make a new connection request.

As the criterion for deciding which communication port, of the plurality of communication ports possessed by the storage system 7, to keep open, it may be arranged to keep open the communication port whose traffic amount is found to be least, or to keep open the communication port that involves least alteration of communication routing.

Although a preferred embodiment of the present invention and a modified example thereof have been described above, these are merely examples given in explanation of the present invention and the scope of the present invention is not intended to be restricted solely to this embodiment and modified example. The present invention could be put into practice in various modified forms.

What is claimed is:

1. An information processing system comprising:
a storage system, one or more servers that perform data communication with said storage system, and a connection control device that controls the connection between said storage system and said servers;
wherein said connection control device comprises:
a connection destination identification unit for identifying which communication port of a plurality of communication ports possessed by said storage system is connected to which server of said one or more servers, based on reports from said storage system;
a load calculation unit, calculating a magnitude of the load of said plurality of communication ports in accordance with a prescribed computational processing procedure, based on communication amount data for each of said plurality of communication ports held in a communication amount data holding unit;
a connection request identification unit that identifies whether or not a new connection request has been made in respect of said storage system, said connection request identification unit identifying a new connection request of unknown value, and said connection destination identification unit identifies that all of said plurality of communication ports possessed by said storage system are connected with said server, a connection destination alteration decision unit prepares a free communication port as a communication destination with a server relating to the new connection request, by deciding on alteration of the connection destination of said server that is the connection destination of one of said plurality of communication ports possessed by said storage system, to another communication port;
wherein in preparing said free communication port by said connection destination alteration decision unit, said connection request identification unit identifies a known value of data relating to the magnitude of the load of each of the plurality of communication ports possessed by said storage system, said connection destination alteration decision unit decides on alteration of a communication port the magnitude of whose load has been identified as being a minimum in accordance with data relating to the magnitude of said load to said communication destination; and
an instruction output unit that issues an instruction to said storage system to connect the server relating to said new connection request to said free communication port that has been prepared by said connection destination alteration decision unit.

2. A method performed in an information processing system comprising:
　　a storage system,
　　one or more servers that perform data communication with said storage system, and a connection control device that controls the connection between said storage system and said servers;
　　wherein said connection control device comprises steps of:
　　identifying which communication port of a plurality of communication ports possessed by said storage system is connected to which server of said one or more servers, based on reports from said storage system;
　　calculating a magnitude of a load of said plurality of communication ports on a request for acquisition of data relating to the magnitude of the load of said plurality of communication ports in accordance with a prescribed computational processing procedure, based on communication amount data for each of said plurality of communication ports held in a communication amount data holding unit;
　　identifying whether or not a new connection request of unknown value has been made in respect of said storage system;
　　determining the new connection request of unknown value has been made, and all of the plurality of communication ports possessed by said storage system are connected with said server;
　　preparing a free communication port as a communication destination with the server to which the new connection request of unknown value relates, by deciding on alteration of a connection destination of said server that is the connection destination of one of said plurality of communication ports possessed by said storage system, to another communication port;
　　wherein determining the new connection request of known value has been made, preparing said free communication port of known value of data relating to the magnitude of the load of each of the plurality of communication ports possessed by said storage system and deciding to alter a communication port the magnitude of whose load has been identified as being a minimum, to said communication destination, in accordance with known value of data relating to the magnitude of said load; and
　　issuing an instruction to said storage system, to connect the server relating to said new connection request to said free communication port decided by the alteration connection decision.

* * * * *